United States Patent [19]

Yamamoto et al.

[11] Patent Number: 5,442,489
[45] Date of Patent: Aug. 15, 1995

[54] MAGNIFYING OBSERVATION APPARATUS

[75] Inventors: Kiyokazu Yamamoto; Masao Yamamoto, both of Tokyo, Japan

[73] Assignees: Scalar Corporation; Mitsubishi Chemical Corporation, both of Japan

[21] Appl. No.: 311,724

[22] Filed: Sep. 23, 1994

Related U.S. Application Data

[63] Continuation of Ser. No. 983,848, filed as PCT/JP92/00836, July 2, 1992, abandoned.

[30] Foreign Application Priority Data

| Jul. 4, 1991 | [JP] | Japan | 3-059676 |
| Jul. 4, 1991 | [JP] | Japan | 3-059677 |
| Jul. 4, 1991 | [JP] | Japan | 3-189569 |

[51] Int. Cl.⁶ .................................................. G02B 27/00
[52] U.S. Cl. .................................. 359/810; 359/799; 359/800; 359/802; 359/385
[58] Field of Search .......... 359/798, 799, 800, 801, 359/802, 803, 806, 809, 810, 385, 386, 388, 389, 390; 385/33, 119

[56] References Cited

U.S. PATENT DOCUMENTS

| 3,621,131 | 11/1971 | Wolff | 358/104 |
| 3,625,607 | 12/1971 | Bravenec | 355/56 |
| 3,877,793 | 4/1975 | Nakagawa | 359/700 |
| 4,176,923 | 12/1979 | Young et al. | 348/320 |
| 4,881,128 | 11/1989 | Yamada | 348/370 |
| 4,930,851 | 6/1990 | Yamamoto | 385/119 |
| 4,988,158 | 1/1991 | Yamamoto | 385/33 |
| 5,126,872 | 6/1992 | Birkle | 385/119 |

FOREIGN PATENT DOCUMENTS

| 61-296869 | 12/1986 | Japan . |
| 62-73877 | 4/1987 | Japan . |
| 63-246731 | 10/1988 | Japan . |
| 1308527 | 12/1989 | Japan . |
| 4107411 | 4/1992 | Japan . |

OTHER PUBLICATIONS

Edited by Minoru Shoji "Photographic lens Handbook" Feb. 15, 1978 Shashin Kogyo Shuppan-sha K.K. (Tokyo).

*Primary Examiner*—Georgia Y. Epps
*Assistant Examiner*—Thomas Robbins
*Attorney, Agent, or Firm*—Michael D. Bednarek; Marks & Murase

[57] ABSTRACT

The present invention relates to a magnifying observation apparatus of a video type in which an image of an object to be observed which has been picked up by an image pick-up apparatus incorporating an imaging device therein is reproduced on a monitor display and observed. It is an object of the invention to attain a compact structure of the entire system so as to permit easy observation in a simple manner. According to the present invention, in order to achieve such object, not only the imaging device but also a control circuit unit for the imaging device, an optical system for focusing the image of the object to be observed on the imaging device, and a light-source lamp for lighting the object to be observed, are incorporated in the image pick-up apparatus.

32 Claims, 11 Drawing Sheets

MAGNIFYING OBSERVATION APPARATUS

This application is a continuation-in-part, continuation of application Ser. No. 07/983,848, filed as PCT/JP92/00836, July 2, 1992 now abandoned.

[FIELD OF ART]

The present invention relates to a magnifying observation apparatus suitable for magnifying and observing various objects in various fields, including the fields of beauty, medical care, science, and industry.

[BACKGROUND ART]

Heretofore, as magnifying and observing instruments or devices there have been used, for example, microscopes and magnifiers. But in the case of a microscope, it is necessary to process an object to be observed and then take it to the microscope side. On the other hand, in the case of a magnifier, it is possible to take the magnifier itself to an object side to be observed and observe the object without applying any processing thereto; however, the magnification is low.

With such circumstances as background, the applicant in the present case has previously developed a magnifying and observing system having both the merit of high magnification of the microscope and the merit of handiness of the magnifier (Japanese Patent Laid Open No. 308527/89, Japanese Patent Application Nos. 26462/89 and 273419/89, U.S. Pat. Nos. 4,930,851 and 4,988,158).

The magnifying and observing system comprises a system body (not shown) composed of a monitor display and a controller, and an image pick-up apparatus (a lens barrel and a light condensing guide which are referred to in Japanese Patent Laid Open No. 308527/89) 100 shown in FIG. 13. The image pick-up apparatus 100 contains a magnifying and focusing optical system 102 and also incorporates therein optical fibers 103 for conducting into the apparatus an illuminating light to illuminate an object M to be observed from a light source provided on the system body side. The image pick-up apparatus 100 is further provided at a front end thereof with a light condensing guide 105. While the image pick-up apparatus is held by hand, the light condensing guide 105 is brought into abutment with the object M or is drawn close thereto, then an image obtained by an imaging device (a solid-state image sensing device) 104 incorporated in the image pick-up apparatus 100 is reproduced on the display and observed. The image pick-up apparatus 100 is constructed so that the focus is sure to be taken automatically when a front end of the light condensing guide 105 is brought into abutment with the object M or drawn close to the object up to a predetermined distance. Anybody can make observation at a magnification of fifty to several thousand diameters without the need of any skill or practice.

In such magnifying and observing system, however, a light source is disposed within the controller for obtaining a stronger illuminating light, which is conducted from the light source to the image pick-up apparatus through optical fibers. A control circuit unit interposed between the imaging device and the display for reproduction is also provided within the controller. Thus, the controller is needed in addition to the image pick-up apparatus and the display, resulting in increase in size as a whole. This point causes dissatisfaction in the case where a greater importance is attached to handiness.

The magnifying and observing system disclosed in the foregoing Japanese Patent Laid Open No. 308527/89 or No. 26462/89 or Japanese Patent Application No. 273419/89, the image pick-up apparatus is provided with an illuminating means, as noted previously, and an image of an object observed is taken in while the object is lighted by the illuminating means, then it is reproduced on the display provided on the system body side and is observed. Therefore, it is possible to make a stand-free observation, that is, carrying the image pick-up apparatus by hand up to an object to be observed and then making observation while keeping the object in place.

In such observation system, however, the light source for illuminating an object to be observed is formed by optical fibers, as mentioned above. More particularly, light is conducted through a bundle of optical fibers from the external light source, and front ends of the optical fibers of the bundle are arranged annularly to form an internal light source. The formation of such an internal light source can afford a stronger and uniform illuminating light, but requires the external light source, or the construction of the image pick-up apparatus becomes complicated. Besides, since expensive optical fibers are used, an increase of cost is unavoidable. Further, a very strong external light source is needed because there occurs propagation loss.

Also in Japanese Patent Application No. 224327/90 (Laid Open No. 107411/92) there is shown an example of a magnifying observation apparatus. This system has been developed for making the magnifying observation apparatus disclosed in the foregoing Japanese Patent Laid Open No. 308527/89, or Japanese Patent Application No. 26462/89 or No. 273419/89 smaller in size and easier to handle. To this end, several improvements are made therein.

One of the improvements resides in a construction wherein not only an imaging device but also a control circuit unit for controlling the imaging device is incorporated in an image pick-up apparatus of the observation system in question. Another improvement resides in that a front end portion of the image pick-up apparatus is bent sideways with respect to the body portion so that it can be handled in a direction which permits easy observation. At the same time, a reflecting mirror is used to change the direction of image light from an object observed. This is owing to the circumstances that since the imaging device is integrally connected with the control circuit unit, a light sensing surface of the imaging device cannot be made directly perpendicular to the direction of image light incident from the sideways-bent front end portion of the image pick-up apparatus. Thus, the structure using a reflecting mirror is not always desirable. The use of a reflecting mirror results in increase in the number of parts and a more complicated structure. Moreover, for example, in the case of using a polarized light, the polarized light is disturbed by the reflecting mirror, so that an accurate observation is impaired.

Further, all of the observation apparatus referred to above involve troublesomeness such that the replacement of optical system is necessary each time the magnification is to be changed.

The use of a magnification-variable optical system having a fixed focal plane is a solution to avoiding such troublesomeness, but those known heretofore as such magnification-variable structure are not suitable for stand-free observation systems. In more particular terms, a zoom lens is a typical example of such magnification-variable structure, but the principle thereof is such that a focal length is changed continuously by changing a mutual spacing of plural constituent lenses. Its design and structure are complicated and an increase in size of the optical system used therein is unavoidable. Thus, the zoom lens is not suitable to an observation system for stand-free observation in which simple structure and small size are ideal.

The present invention which has been accomplished under the above-mentioned background aims at attaining a reduction in size and handiness to a greater extent than in the conventional magnifying observation apparatus having such basic structure as referred to above.

It is another object of the present invention to provide a magnifying observation apparatus having a structure which does not require the use of optical fibers.

It is a further object of the present invention to provide a structure of an image pick-up apparatus having a front end portion bent sideways with respect to a body portion thereof which structure does not require the use of a reflecting mirror for focusing an image light incident from the bent front end portion onto a light receiving surface of an imaging device.

It is a still further object of the invention to provide a simple magnification-variable structure, namely, a simple zooming structure, suitable to an observation system for stand-free observation.

[DISCLOSURE OF THE INVENTION]

According to the present invention, in a magnifying observation apparatus wherein an image of an object picked up by an image pick-up apparatus is reproduced on a display and observed, at least an imaging device, a control circuit unit for the imaging device, an optical system for focusing the image of the object on the imaging device, and a lamp as a light source for illuminating an object to be observed, are incorporated in the image pick-up apparatus.

In this magnifying observation apparatus according to the invention, since the light-source lamp and the control circuit unit, in addition to the imaging device, are also incorporated in the image pick-up apparatus, the controller which is needed in the foregoing conventional systems is no longer necessary, so that the system is reduced in size as a whole. Besides, since the lamp as a light source incorporated in the image pick-up apparatus illuminates an object to be observed directly in close proximity thereto, there is no propagation loss which occurs in the use of optical fibers, and therefore it is possible to use a lamp of a smaller output. Thus, the incorporation of a light-source lamp into the image pick-up apparatus leads to the possibility of a marked reduction in size of the lamp itself. Also as to the control circuit unit, since it is closer to the imaging device, it is possible to use a control circuit unit of a far smaller capacity than in the conventional systems, and thus the incorporation of a control circuit unit into the image pick-up apparatus leads to the possibility of a great reduction in size of the same unit. That is, these reductions in size permit their incorporation to a still further extent, and such an organic correlation brings about the reduction in size of the whole. The term "light-source lamp" or "lamp" as used herein and also in the appended claims is used in a broad concept which covers not only incandescent lamps and fluorescent lamps but also light emitting diode and the like.

In the present invention, the light-source lamp is constituted as a lamp unit comprising plural lamps arranged in a predetermined state on a board. The whole of the lamp unit can be mounted and removed. That is, by using a plurality of small lamps in a predetermined state of arrangements it is made possible to accommodate in a narrow space a light source which can supply a required illuminative force, and obtain illumination which is uniform and does not give rise to unevenness in luminance for an object to be observed. Besides, since the whole of the lamp unit can be mounted and removed, it is possible to effect the replacement of lamps easily.

In the present invention, moreover, a front end portion of the image pick-up apparatus is bent sideways with respect to the body portion thereof, and the imaging device is incorporated in the image pick-up apparatus in such a manner that a light receiving surface of the imaging device is perpendicular to the optical axis of an image light which is incident from the bent front end portion. Consequently, it is possible to make observation in a sideways facing state of the image pick-up apparatus, that is, while the longitudinal side of the image pick-up apparatus is placed in parallel with the surface of an object to be observed. For example, in observing skin of user's face, observation can be done more easily. Moreover, since the light receiving surface of the imaging device is positioned perpendicularly to the optical axis of an image light which is incident from the bent front end portion, it is not necessary to change the optical axis of the light and hence it is not necessary to use a reflecting mirror.

Further, in the present invention, a simple zooming structure is formed by allowing an objective lens and an imaging device to slide interlockedly while forming a predetermined relation between the two.

This simple zooming structure utilizes the fact that a magnification, m, obtained by an optical system has the relation of $m = b/a$ (a: distance between an object to be observed and the objective lens, b: distance between the objective lens and the imaging device). The value of $m = b/a$ is changed continuously by allowing the objective lens and the imaging device to slide in an interlocked state which satisfies the relation of $1/a + 1/b = 1/f$ (f: focal length of the objective lens). As a result, it is possible to change magnification while maintaining the image pick-up apparatus at a predetermined certain distance from the object to be observed.

A preferred structure of such interlocked sliding of the optical system and the imaging device utilizes a cam structure. More specifically, the objective lens is held in a fixed state by an optical system holding cylinder having a roller projection on the periphery thereof, while the imaging device is held also in a fixed state by an imaging device holding cylinder having a roller projection on the periphery thereof. The holding cylinders are both held slidably by an intermediate cylinder having a rectilinear guide slot formed on the periphery thereof. Further, the intermediate cylinder is held for relative rotation by a cam cylinder having cam slots for the optical system and the imaging device, respectively, which cam slots are formed in the periphery of the cam cylinder. Upon rotation of the cam cylinder, the roller projections which are engaged through the guide slot of the intermediate cylinder with the cam slots for the optical system and the imaging device, respectively, of the cam cylinder, are all individually restricted their movement by the cam slots each formed in a predetermined curvilinear shape. Consequently, the objective lens and the imaging device slide interlockedly under a predetermined relationship while their rotation is prevented by the guide slot of the intermediate cylinder.

[FORMS FOR PRACTICING THE INVENTION]

Figure 1:
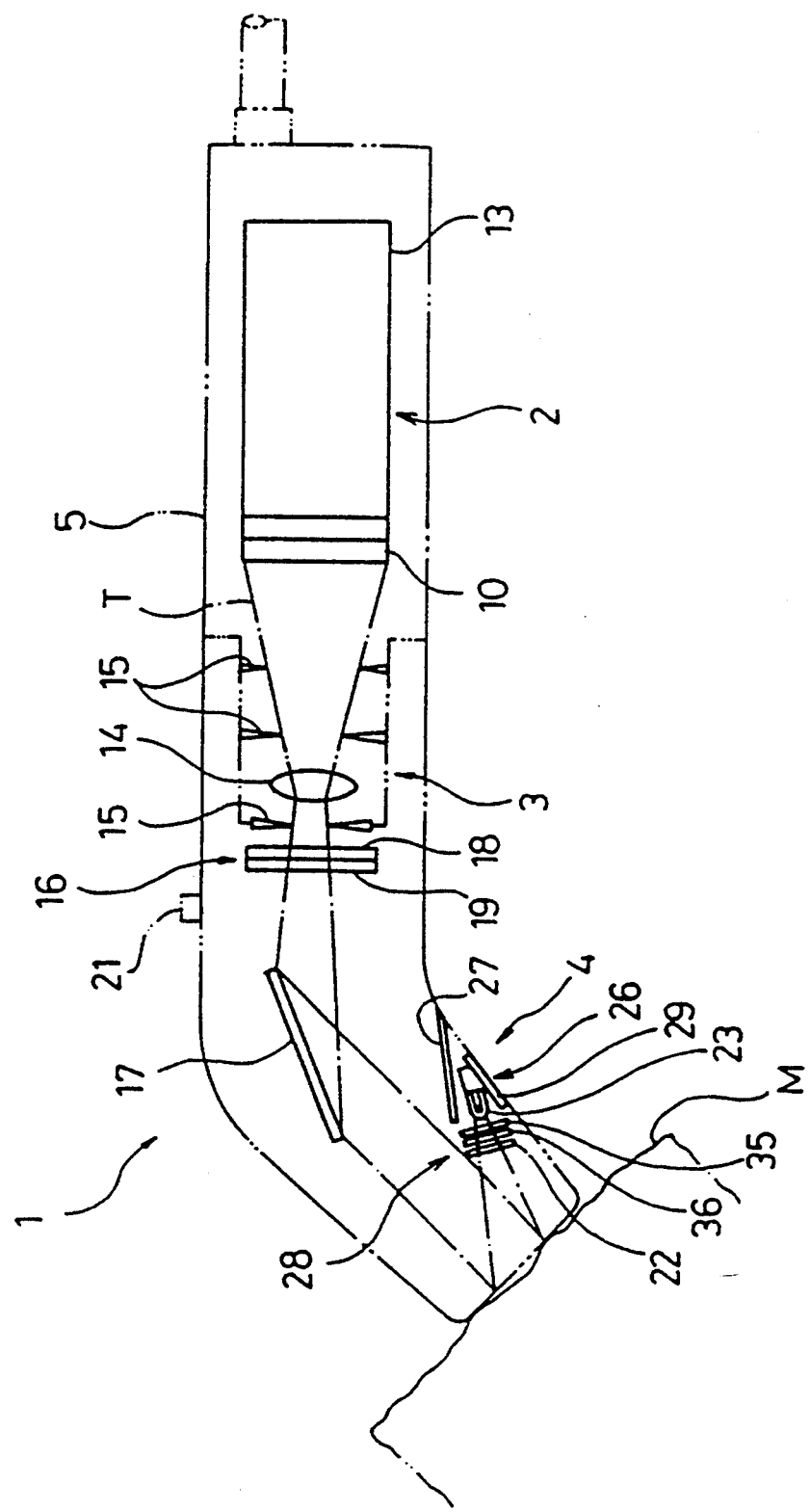
FIG. 1 is a construction diagram of an image pick-up apparatus according to a first embodiment of the invention.

Embodiments of the present invention will be described hereinunder.

First Embodiment (FIG. 1 to FIG. 4)

An image pick-up apparatus 1 according to this embodiment includes an imaging means 2, an optical means 3 and a light source means 4, which are enclosed within a case 5. It is of a size which permits the apparatus to be grasped easily by one hand. Its front end portion is bent in an inclined state so as to be suitable for observing the face skin while the apparatus is held by one hand.

The imaging means 2 comprises an imaging device 10 using a CCD and a control circuit unit 13 for controlling the imaging device 10 and for amplifying an image signal.

The optical means 3 comprises an optical lens 14 and plural flare stops 15, 15, . . . . The flare stops 15, 15, . . . are provided projectingly in an annular form to form a minimum optical path T required. The formation of such optical path T by the flare stops 15, 15, . . . is extremely useful in obtaining a clear image.

In association with the optical means 3, a polarizing unit 16 is disposed just in front of the optical lens 14. Further, in the optical path between the optical lens 14 and an object M to be observed there is disposed a reflecting mirror 17 in a front position with respect to the polarizing unit 16.

The polarizing unit 16 comprises a second polarizer 18 and a polarization plane rotating means 19. Polarized light obtained by a first polarizer 22 which will be described later can be shut off by turning ON a non-reflection image switch 21 provided on the outer surface of the case 5. More specifically, in this embodiment, a liquid crystal is used as the polarization plane rotating means 19. As shown in the circuit diagram of FIG. 4, upon turning ON of the non-reflection image switch 21, lamps 23, 23, . . . of the light source means 4 which will be described later go on and an oscillator 24 operates, so that the polarization plane rotating means 19 causes the polarization plane of polarized light to rotate 90° and hence the polarized light obtained by the first polarizer 22 is cut off by the second polarizer 18. Conversely, when the non-reflection image switch 21 is OFF, the polarized light can pass through the second polarizer 18.

It is a reflection image switch 25 that is disposed in parallel with the non-reflection image switch 21. When the switch 25 is turned ON, only the lamps 23, 23, . . . of the light source means 4 go on.

Thus, by utilizing the polarized light, it is made possible to select an image light and perform more versatile observations. The light from the object M to be observed is classified into a surface reflected light reflected directly by the surface of the object M and a non-surface reflected light which has once passed through the surface layer of the object M. The surface reflected light retains the polarizability obtained by the first polarizer 22, whereas the non-surface reflected light loses polarizability and becomes a natural light. Therefore, an image containing such surface reflected light and an image not containing it can be observed selectively according to whether the polarized light is allowed to pass or cut off. By such a selective observation it is made possible to observe a surface state or structure of an object which can be seen more clearly by the use of a surface reflected light, as well as a surface state or structure of an object which can be seen more clearly by the use of a non-surface reflected light, both in a state easier to see. Thus, the versatility or observation is attained.

The reason why the polarizing unit 16 is disposed just in front of the optical lens 14 is that the maximum operating temperature of the polarization plane rotating means 19 using liquid crystal is about 40° C., but the temperature near the light source means 4 which will be described later sometimes exceeds the maximum operating temperature, so at such a higher temperature the polarization plane rotating means 19 may not operate accurately.

The reflecting mirror 17 is provided for changing the optical path in accordance with the inclination of the front end portion mentioned previously. It is a surface reflection type. More specifically, a reflective surface of the reflecting mirror 17 is exposed and light is reflected directly by the exposed reflective surface, unlike an ordinary type of mirror in which a reflective surface is formed at the back of a transparent material (e.g. glass) and light passes through the transparent material at the time of reflection.

The use of such a surface reflection type reflecting mirror is related to the foregoing polarization. More particularly, since the polarizing unit 16 must be disposed in a position rearer than the reflecting mirror 17 for the reason stated above, the passage of polarized light through a transparent material will result in the polarizability thereof being disturbed, thus making it impossible to effect accurately such observation using polarized light as mentioned above. The light source means 4 comprises a lamp unit 26, a diffusion preventing mirror 27 and a lighting/processing unit 28.

Figure 2:
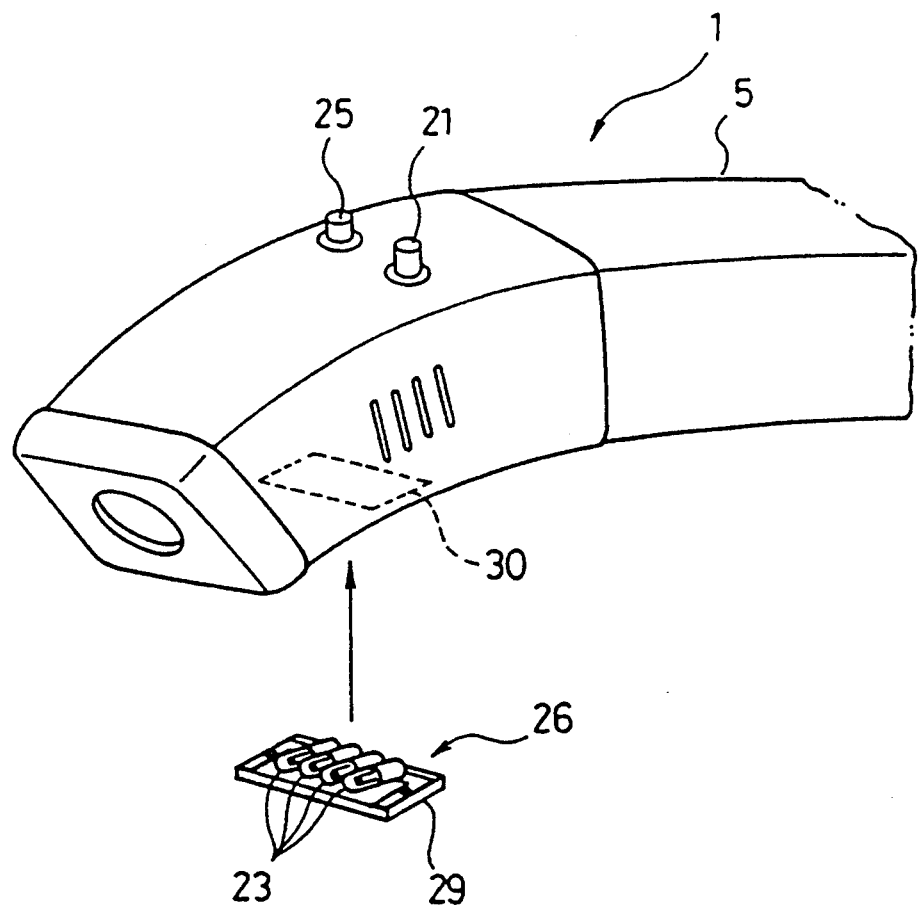
FIG. 2 is a partial perspective view of the image pick-up apparatus of the first embodiment.
Figure 3:
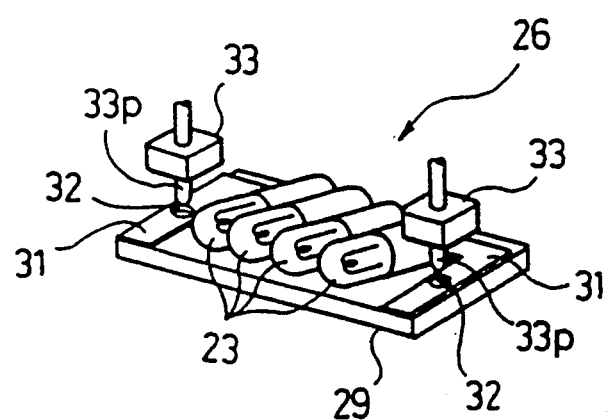
FIG. 3 is a perspective view showing a relation between a lamp unit and connecting terminals in the image pick-up apparatus of the first embodiment.

As shown in FIGS. 2 and 3, the lamp unit 26 comprises a plurality (four in this embodiment) of lamps 23, 23, . . . arranged side by side on a board 29. It can be mounted and removed through the board 29 with respect to a mounting hole 30 formed in the case 5.

Figure 4:
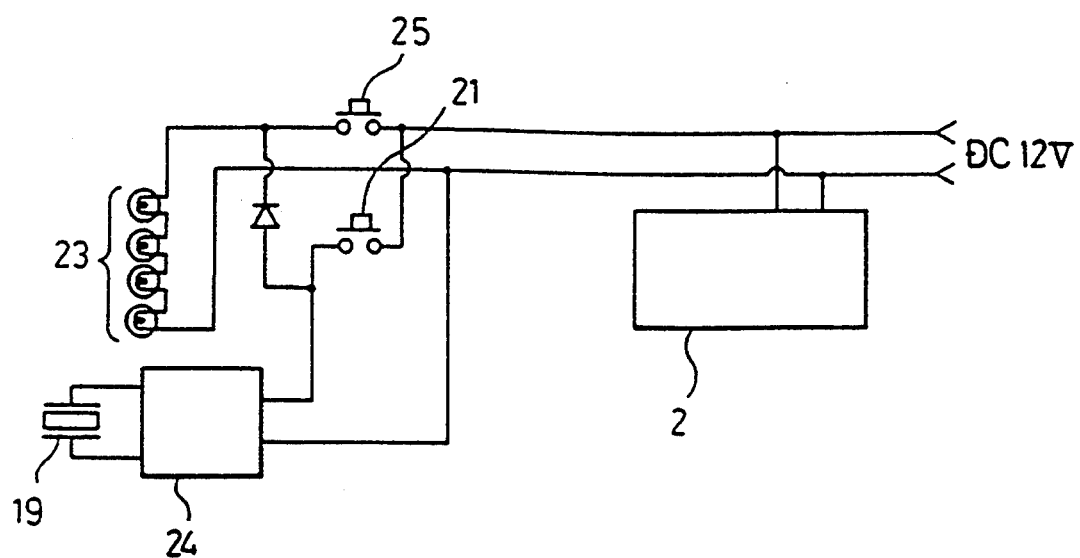
FIG. 4 is an electric circuit diagram of the image pick-up apparatus of the first embodiment.

As shown in FIG. 4, the four lamps 23, 23, . . . are connected in series, and assuming that a rated voltage of each lamp 23 is 2.5 V, a voltage of 12 V is applied to the series-connected lamps. This is because by applying a voltage 20% higher than the total rated voltage of 10 V of the four lamps 23, 23, . . . there is obtained brightness which is twice the brightness obtained at such rated voltage. On the other hand, the service life is reduced to about one tenth.

The reason why such strong brightness is to be obtained at the sacrifice of the service life is that it is intended to realize in a narrow space a lighting force which can afford a sufficient brightness even if there occurs extinction due to the first and second polarizers 22, 18.

Further, the reason why the lamps 23, 23, . . . are connected in series is that it is intended to reduce the size of the lamp unit 26 and simplify the structure of an electric system, for mounting in a narrow space. More specifically, the size of each lamp is reduced by using a lamp of 2.5 V in rated voltage to thereby attain the reduction in size of the lamp unit 26, and a power supply of 12 V necessary for the oscillator 24 can be used also for the lamp unit 26 without using a transformer to thereby simplify the structure of the electric system.

On the board 29 is formed a partial power-supply circuit 31 for the lamps 23, for example by printing, with terminal receiving holes 32, 32 being formed in both end portions of the circuit 31. When the lamp unit 26 is mounted into the mounting hole 30 as mentioned previously, terminal pins 33p of connecting terminals 33 are fitted in the terminal receiving holes 32, 32 to make connection with a power-supply circuit 31 in FIG. 4.

The reason why the lamp 26 is constituted as above and made detachable wholly as one unit is that the replacement thereof should be done in a simple manner to further facilitate the use thereof since the service life of the lamp 23 is sacrificed for attaining a stronger brightness as noted previously. In this connection, it is most preferable in mounting and removing operations to utilize the mounting hole 30 formed in the case 5, provided that a complicated structure results. Therefore, instead of this structure there may be adopted a structure wherein a suitable receptacle portion for the mounting and removal of the lamp unit is formed in the interior of the case 5.

The diffusion preventing mirror 27 is for preventing the light from the lamps 23, 23, . . . from entering the optical path of the optical means 3 directly and for directing the light efficiently to the object M to be observed. The mirror 27 is provided so as to cover the lamps 23, 23, . . . from above like eaves.

The lighting/processing unit 28 comprises a diffuser panel 35, a heat rays absorbing plate 36 and the first polarizer 22, which are arranged in this order successively from the side closer to the lamp unit 26 so as to intersect the radiation of light from the lamp unit. The heat rays absorbing plate 36 functions to remove heat rays from the light emitted from the lamps 23, 23, . . . , thereby preventing the rise of the internal temperature of the case 5. The first polarizer 22 functions to polarize the light emitted from the lamps 23, 23, . . . . The lighting using the resulting polarized light is utilized as explained previously.

Second Embodiment (FIG. 5 to FIG. 8)

Figure 5:
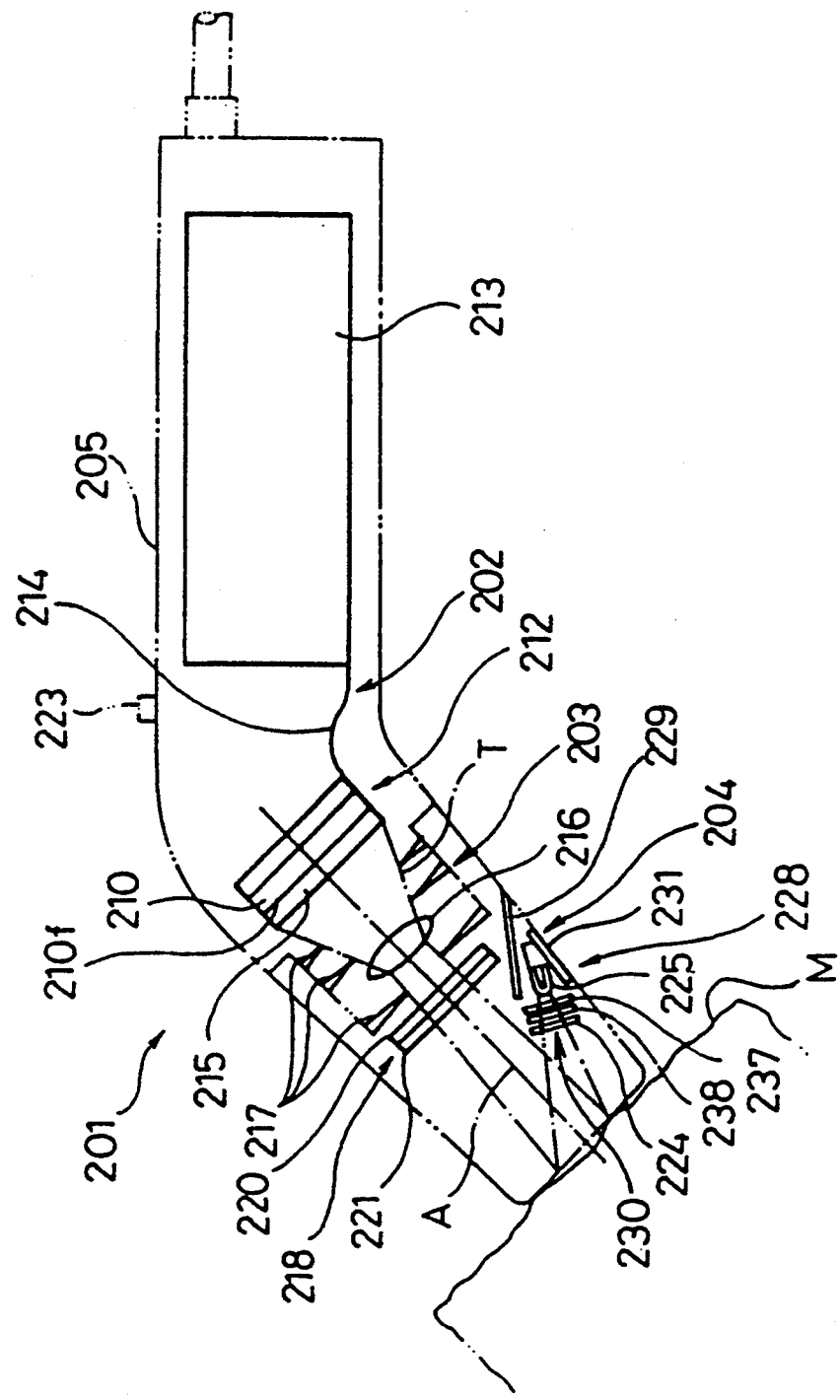
FIG. 5 is a construction diagram of an image pick-up apparatus according to a second embodiment of the invention.
Figure 6:
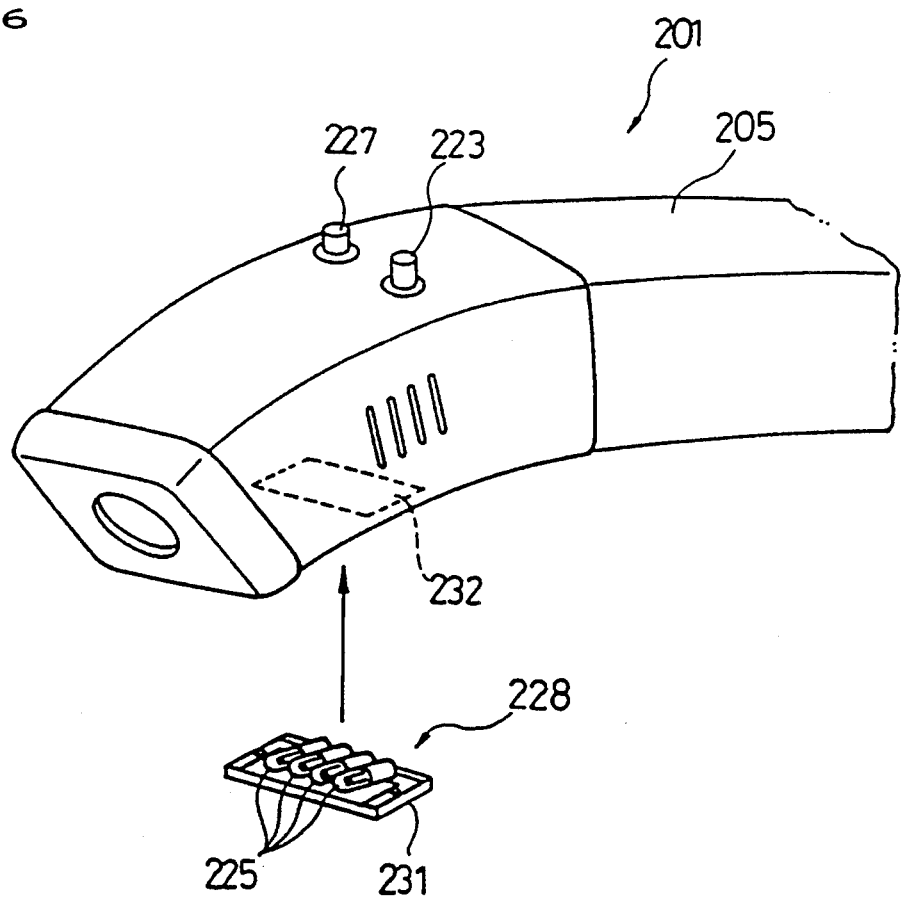
FIG. 6 is a partial perspective view of the image pick-up apparatus of the second embodiment.
Figure 7:
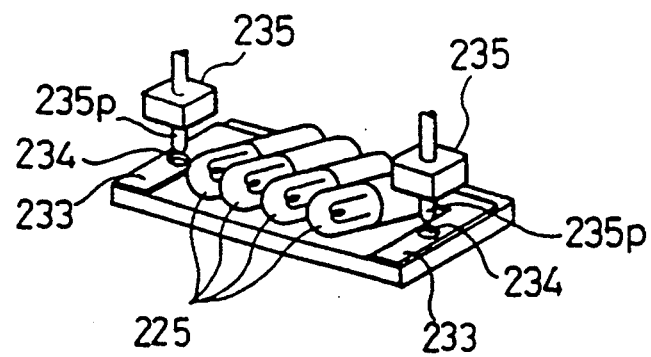
FIG. 7 is a perspective view showing a relation between a lamp unit and connecting terminals in the image pick-up apparatus of the second embodiment.
Figure 8:
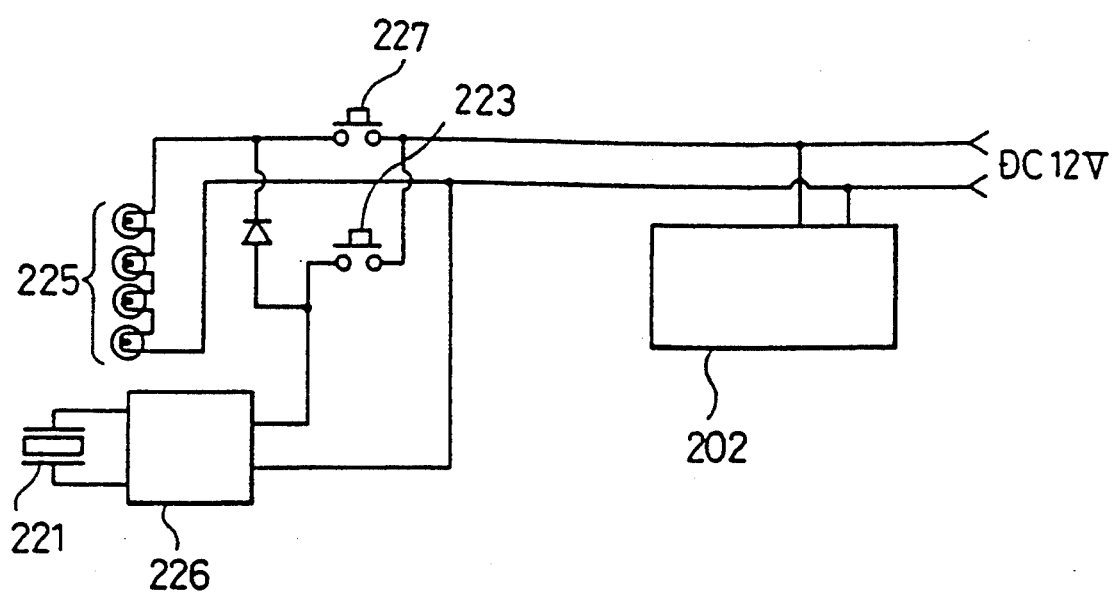
FIG. 8 is an electric circuit diagram of the image pick-up apparatus of the second embodiment.

An image pick-up apparatus 201 according to this embodiment is basically the same as in the first embodiment, as shown in FIG. 5, and it comprises an imaging means 202, an optical means 203, and a light source means 204, which are enclosed in a case 205. The image pick-up apparatus 201 has a body portion of a size which permits the user to grasp the body portion easily by one hand. On the other hand, a front end portion of the apparatus 201 is bent in an inclined state with respect to the body portion to suit the observation of, for example, the face skin while the body portion is held by one hand.

The imaging means 202, like the imaging means 2 in the first embodiment, comprises an imaging device 210 using a CCD and a control circuit unit 213 for controlling the imaging device 210 and for amplifying an image signal. But a difference from the imaging means 2 in the first embodiment is recognized in that the imaging device 210 is connected to the control circuit unit 213 through a flexible cable 214, that is, the imaging device 210 is rendered movable freely with respect to the control circuit unit 213.

Utilizing such free movability, the imaging device 210 is disposed in such a manner that a light receiving surface 210f of the imaging device 210 is orthogonal to an optical axis A of an image light which is incident front the bent front portion of the image pick-up apparatus, that is, in such a manner as to eliminate the necessity of changing the optical axis of the image light.

It is a color filter 215 that is disposed in front of the imaging device 210. The color filter 215 functions to adjust the wavelength characteristics of light which enters the imaging device 210, in accordance with color characteristics of the imaging device.

As other components there are used optical means 203, optical lens 216, flare stops 217, polarizing unit 218, second polarizer 220, polarization plane rotating means 221, non-reflection image switch 223, first polarizer 224, light source means 204, lamp 225, oscillator 226, reflection image switch 227, lamp unit 228, diffusion preventing mirror 229, lighting/processing unit 230, partial power-supply circuit 231, terminal receiving hole 234, mounting hole 232, connecting terminal 235, terminal pin 235p, diffuser panel 237, and heat rays absorbing plate 238. Since these components are the same as in the first embodiment, explanations thereof are here omitted.

Third Embodiment (FIG. 9 to FIG. 12)

Figure 9:
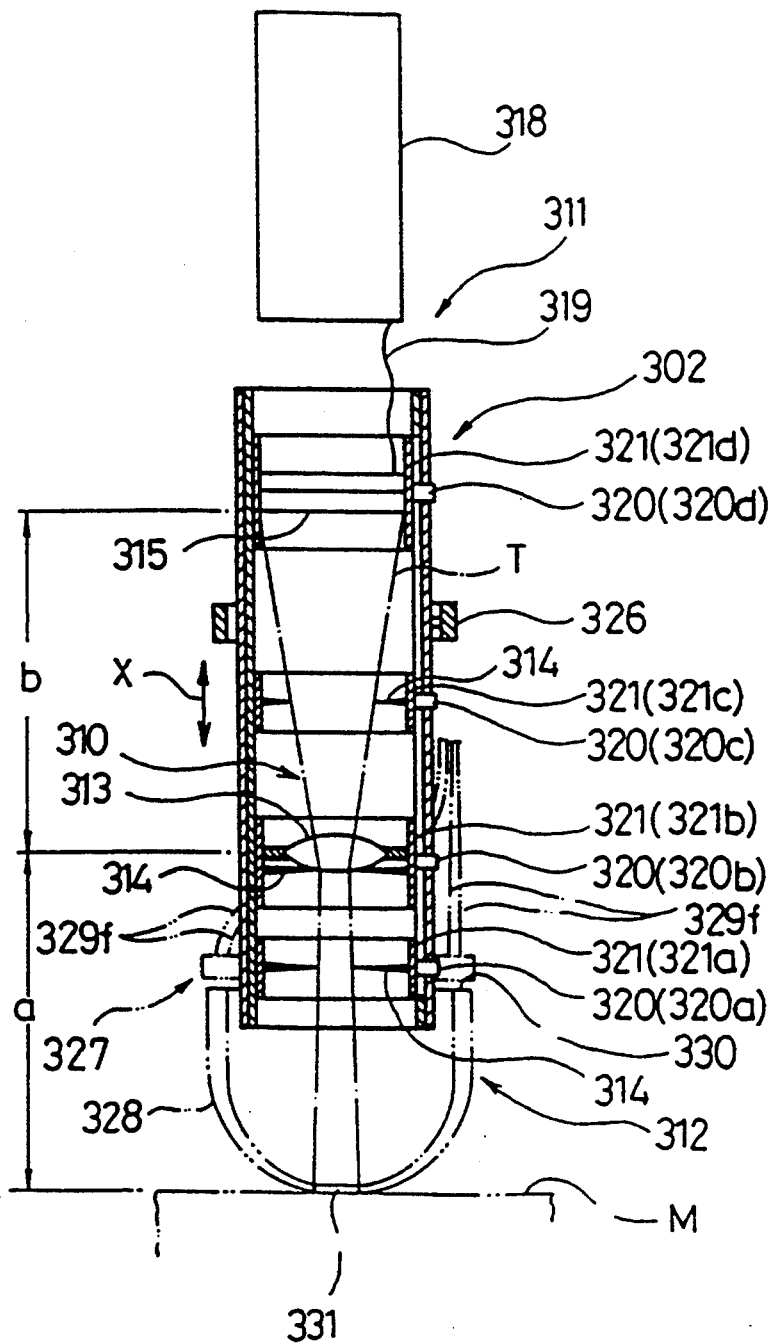
FIG. 9 is a construction diagram of an image pick-up apparatus according to a third embodiment of the invention.

As shown in FIG. 9, the image pick-up apparatus 302 according to this embodiment contains an optical system unit 310 and an imaging unit 311, and is also provided with a lighting unit 312. The image pick-up apparatus 302 is used as in FIG. 11. An image picked up by the apparatus 302 is reproduced on a display 304 of a display apparatus 303 and is observed. The image pick-up apparatus 302 and the display apparatus 303 combine as a set and constitute a magnifying observation apparatus 301.

The optical unit 310 comprises an objective lens 313 and plural flare stops 314, 314, . . . . Since the flare stops 314, 314, ... are formed projectingly in an annular shape to form a minimum optical path T required, the formation of such optical path T by those flare stops is extremely useful in obtaining a clear image.

The imaging unit 311 comprises an imaging device 315 and a control circuit unit 318 for controlling the imaging device 315 and for amplifying an image signal, the imaging device 315 and the control circuit unit 318 being connected with each other through a flexible cable 319.

The objective lens 313, flare stops 314, 314, ... and imaging device 315 of both optical system 310 and imaging unit 311 are adapted to slide like arrow X in interlock with each other by means of a slide mechanism which utilizes a cam structure.

Figure 10:
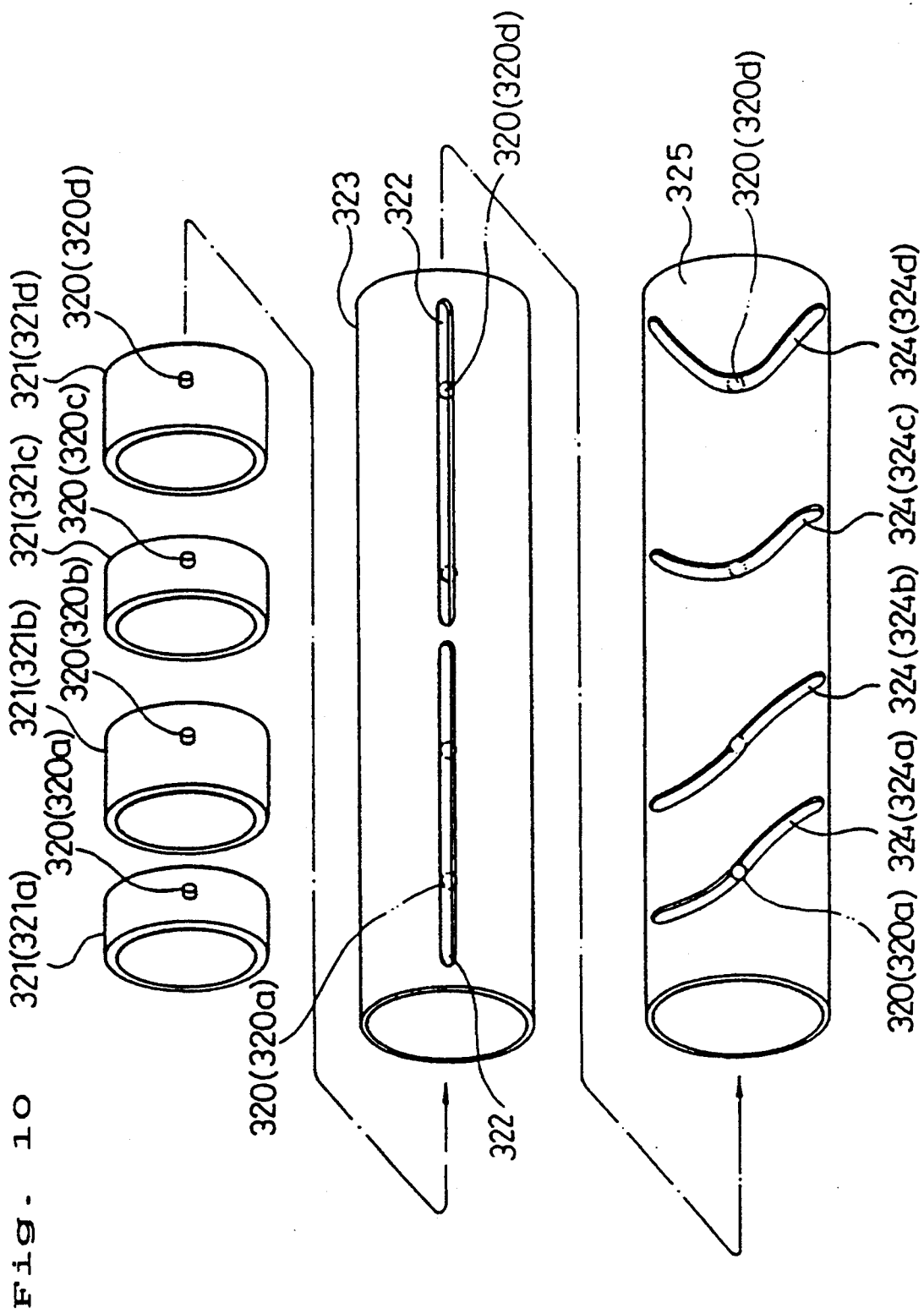
FIG. 10 is an exploded perspective view of a slide mechanism.
Figure 11:
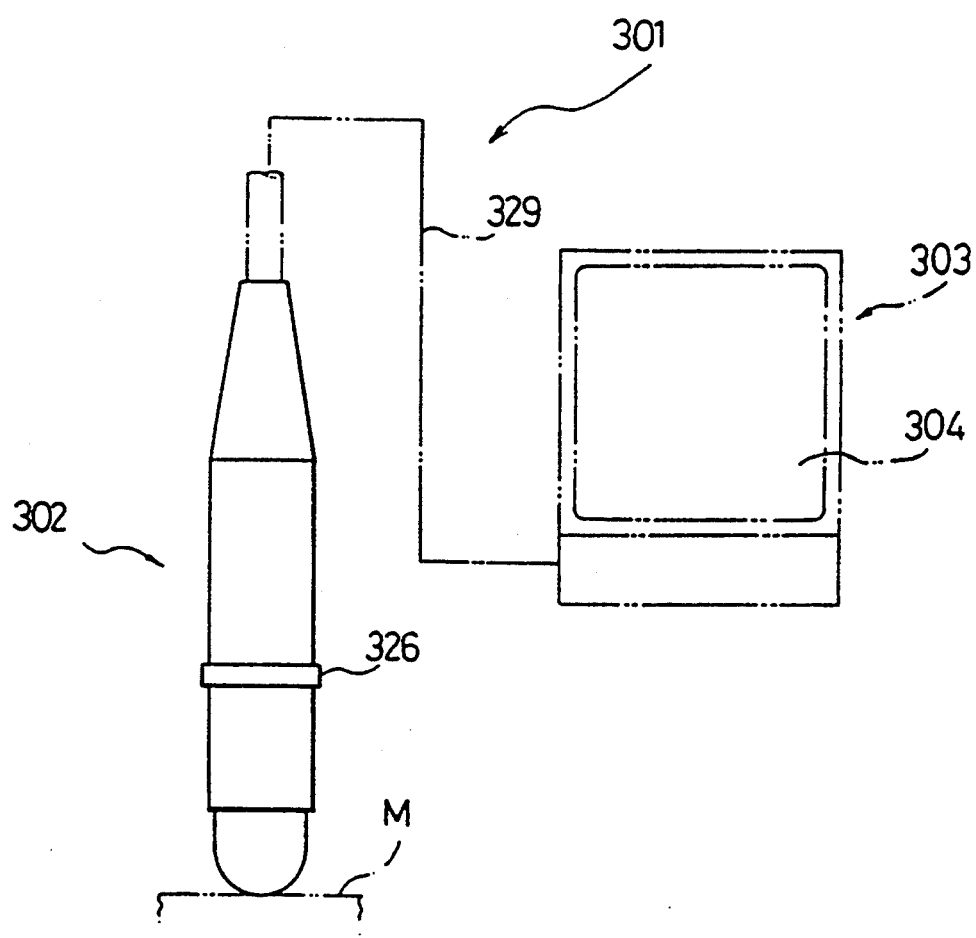
FIG. 11 is a construction diagram of an observation system using the image pick-up apparatus of the third embodiment.

More specifically, as shown in FIG. 10, the slide mechanism comprises a plurality of holding cylinders 321 (321a, 321b, 321c, 321d) for the optical system and for the imaging device, with roller projections 320 (320a, 320b, 320c, 320d) being formed on the periphery of the cylinders 321; an intermediate cylinder 323 having rectilinear guide slots 322 formed in the periphery thereof; and a cam cylinder 325 having cam slots 324 (324a, 324b, 324c, 324d) for the optical system and for the imaging device, formed on the periphery thereof. These holding cylinders are combined together so that the holding cylinders 321a, 321b, 321c and 321d are held slidably by the intermediate cylinder 323, which in turn is held by the cam cylinder 325 in a relatively rotatable manner.

Therefore, as the cam cylinder 325 is rotated by an operating ring 326, the roller projections 320a, 320b, 320c and 320d are all individually restricted their movement by the cam slots 324a, 324b, 324c and 324d which are each formed in a predetermined curvilinear shape, whereby the holding cylinders 321a, 321b, 321c and 321d are allowed to slide like arrow X. At this time, since the holding cylinders 321a, 321b, 321c and 321d are restricted their movement by the guide slots 322 of the intermediate cylinder 323, they are prevented from rotating with the rotation of the cam cylinder 325. Consequently, the objective lens 313, flare stops 314, 314, ... and imaging device 315, which are held in a fixed state by the holding cylinders 321a, 321b, 321c and 321d, slide interlockedly while maintaining a predetermined relation.

Figure 12:
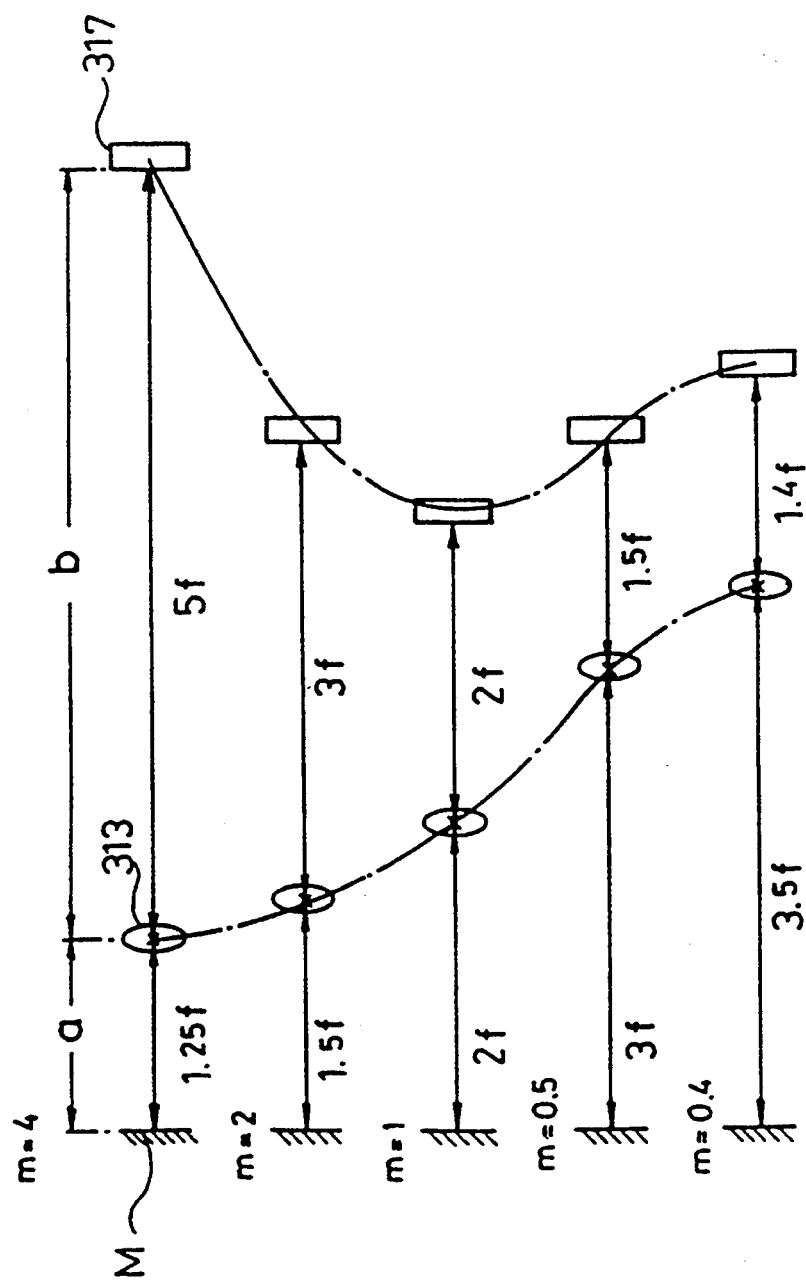
FIG. 12 is an explanatory diagram showing a relation among an object to be observed, an objective lens and an imaging device.
Figure 13:
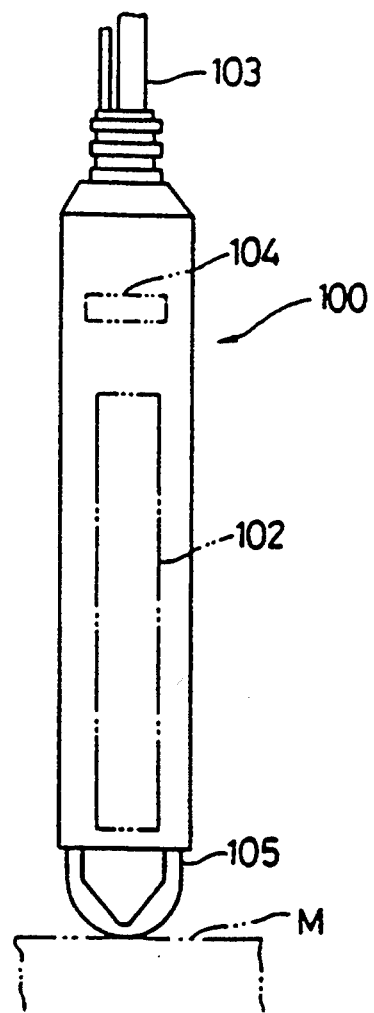
FIG. 13 is a construction diagram of an image pick-up apparatus in a conventional magnifying system.

The predetermined relation utilizes the fact that a magnification, m, obtained by the optical system has the relation of m=b/a (a: distance between the object M to be observed and the objective lens 313, b: distance between the objective lens 313 and the imaging device 315, FIG. 12). The objective lens 313 and the imaging device 315 are allowed to slide interlockedly so that a and b form a ratio which affords a stationary state between the image pick-up apparatus 302 and the object M to be observed, on the basis of a predetermined relation, namely, a relation of 1/a+1/b=1/f (f: focal length of the objective lens), thereby changing m=b/a continuously. By using such a slide mechanism it is made possible to change the magnification in a fixed state of the distance between the image pickup apparatus 302 and the object M to be observed, that is, a so-called simple zoom structure is formed. As to the interlocking relation of the flare stops 314, 314, ..., these flare stops follow the optical path T which varies in response to sliding motions of the objective lens 313 and the imaging device 315.

The lighting unit 312 comprises a light source 327 and a light condensing guide 328 for radiating light from the light source 327 efficiently to a portion to be observed.

In the light source 327, light from an external light-source lamp (not shown) is conducted up to the image pick-up apparatus, using a bundle of optical fibers extending through a cable 329, and front ends for irradiation of optical fibers 329f, 329f, ... of such optical fiber bundle are implanted in an annular holding member 330. Light radiated from the irradiating front ends of the so-arranged optical fibers 329f, 329f, ... reaches an incident end face 330 formed at a base end of the light condensing guide 328 which will be described below.

The light condensing guide 328 is formed in a hollow semispherical shape or a cylindrical shape having a hollow semispherical front portion, using a transparent material, e.g. an acrylic resin. A base end of its rear end portion is formed as the incident end face 330, and a through hole 331 is formed centrally of its front portion. The light radiated from the light source 327 through the incident end face 330 travels through the solid interior under total reflection and is conducted up to the through hole 331, then radiates the portion to be observed of the object M in a nearly horizontal state from the inside surface of the hole. At the same time, light which has leaked inside the light condensing guide 32B without entering the incident end face 330 illuminates the portion to be observed as a drop light from above. The light condensing guide 32B also has a focusing function. With its front end abutted to the object N to be observed, the objective lens 313 is focused on the object M.

Although in this third embodiment the simple zoom structure thereof is applied to the method in which light is conducted through a bundle of optical fibers from an external light-source lamp, that is, an external light-source lamp method, it can be done easily by those skilled in the art to apply the simple zoom structure of this embodiment to such a light-source lamp built-in type structure as in each of the first and second embodiments on the basis of this third embodiment.

We claim:

1. A magnifying observation apparatus for reproducing an image of an object to be observed which has been picked up by an image pick-up apparatus onto a monitor display and observing it, said image pick-up apparatus having a structure with a case of an essentially one-handed grapsable size, said case having a viewing hole formed therein and encasing therein at least an imaging device, a control circuit unit for the imaging device, an optical system for focusing the image of the object to be observed on the imaging device, and a light-source lamp encases by the casing for lighting the object to be observed through the viewing hole.

2. A magnifying observation apparatus according to claim 1, wherein said light-source lamp is formed as a lamp unit comprising a plurality of lamps arranged in a predetermined state on a board in such a manner that the whole of the lamp unit can be mounted to and removed from said image pick-up apparatus.

3. A magnifying observation apparatus according to claim 1, wherein a front end portion of said image pick-up apparatus is bent sideways, and said imaging device is incorporated in the image pick-up apparatus in such a manner that a light receiving surface of the imaging device is orthogonal to an optical axis of an image light which is incident from the thus-bent front end portion of the image pick-up apparatus.

4. A magnifying observation apparatus according to claim 1 wherein an objective lens of said optical system and said imaging device slide in interlock with each other while satisfying the relation of $1/a+1/b=1/f$ (a: distance between the object to be observed and the objective lens, b: distance between the objective lens and the imaging device, f: focal length of the objective lens).

5. A magnifying observation apparatus according to claim 4, wherein said objective lens is held in a fixed state by an optical system holding cylinder having a roller projection formed on the periphery thereof, said imaging device is held in a fixed state by an imaging device holding cylinder having a roller projection formed on the periphery thereof, both said holding cylinders being held slidably by an intermediate cylinder having a rectilinear guide slot formed on the periphery thereof, said intermediate cylinder being held relatively rotatably by a cam cylinder having a cam slot for the optical system and a cam slot for the imaging device, said cam slots being formed in the periphery of the intermediate cylinder, and said objective lens and said imaging device are allowed to slide in interlock with each other while forming a predetermined distance relation in response to rotation of said cam cylinder through the roller projections which are engaged with the cam slots of the cam cylinder through the guide slot of said intermediate cylinder.

6. A magnifying observation apparatus for reproducing, on to a monitor display, an image of an object to be observed which has been picked up by an image pick-up apparatus said image pick-up apparatus having incorporated therein at least an imaging device, a control circuit unit for the imaging device, an optical system for focusing the image of the object to be observed on the imaging device, and a light source means for lighting the object to be observed, the optical system including an objective lens and wherein the objective lens of said optical system and said imaging device slide in interlock with each other while satisfying the relation of $1/a+1/b=1/f$, where a is the distance between the object to be observed and the objective lens, b is the distance between the objective lens and the imaging device, and f is the focal length of the objective lens.

7. A magnifying observation apparatus that includes and image pick-up apparatus for reproducing, onto a monitor display, an image of an object located proximate the image pick-up apparatus which has been picked up by an image pick-up apparatus the image pick-up apparatus including a casing having a viewing hole formed therein and further including at least an imaging device, a control circuit unit for the imaging device, an optical system for focusing the image of an object to located proximate the viewing hole on the imaging device, and a light-source lamp for lighting the object to be observed, wherein said light-source lamp is formed as a lamp unit comprising a plurality of lamps arranged in a predetermined state on a board in such a manner that the entire lamp unit can be mounted to and removed from said image pick-up apparatus.

8. A magnifying observation apparatus according to claim 7, wherein a front end portion of said image pick-up apparatus is bent sideways, and said imaging device is incorporated in the image pick-up apparatus in such a manner that a light receiving surface of the imaging device is orthogonal to an optical axis of an image light which is incident from the thus-bent front end portion of the image pick-up apparatus.

9. A magnifying observation apparatus according to claim 7, wherein an objective lens of said optical system and said imaging device slide in interlock with each other while satisfying the relation of $1/a+1/b=1/f$, where a is the distance between the object to be observed and the objective lens, b is the distance between the objective lens and the imaging device, and f is the focal length of the objective lens.

10. A magnifying observation apparatus according to claim 9, wherein said objective lens is held in a fixed state by an optical system holding cylinder having a roller projection formed on the periphery thereof, said imaging device is held in a fixed state by an imaging device holding cylinder having a roller projection formed on the periphery thereof, both said holding cylinders being held slidably by an intermediate cylinder having a rectilinear guide slot formed on the periphery thereof, said intermediate cylinder being held relatively rotatably by a cam cylinder having a cam slot for the optical system and a cam slot for the imaging device, said cam slots being formed in the periphery of the intermediate cylinder, and said objective lens and said imaging device are allowed to slide in interlock with each other while forming a predetermined distance relation in response to rotation of said cam cylinder through the roller projections which are engaged with the cam slots of the cam cylinder through the guide slot of said intermediate cylinder.

11. A magnifying observation apparatus that includes an image pick-up apparatus for reproducing an image of an object located proximate the image pick-up apparatus onto a monitor display, said image pick-up apparatus comprising a casing having a viewing hole, the casing enclosing at least an imaging device, a control circuit unit for processing a signal received from the imaging device and emitting a video signal, an optical system for focusing the image of an object located proximate the viewing hole on the imaging device, and a light-source for lighting the object to be observed.

12. A magnifying observation apparatus according to claim 11, wherein said light-source is a lamp unit that comprises at least one lamp arranged on a board such that the lamp unit can be mounted to and removed from said image pick-up apparatus.

13. A magnifying observation apparatus according to claim 11, wherein a front end portion of said image pick-up apparatus is bent sideways.

14. A magnifying observation apparatus according to claim 11, wherein an objective lens of said optical system and said imaging device slide in interlock with each other.

15. A magnifying observation apparatus according to claim 11, wherein the image pick-up apparatus is connected to the monitor by a wire that transmits information from the imaging device to the monitor.

16. A magnifying observation apparatus that includes an image pick-up apparatus for reproducing an image of an object located proximate to image pick-up apparatus onto a monitor display, said image pick-up apparatus comprising a casing, the casing enclosing at least an imaging device, a control circuit unit for the imaging device, an optical system for focusing the image of an object onto the imaging device, and a light-source lamp means for lighting the object to be observed.

17. A magnifying observation apparatus according to claim 16, wherein said light-source lamp means is a lamp unit that comprises at least one lamp arranged on a board such that the lamp unit can be mounted to and removed from said image pick-up apparatus.

18. A magnifying observation apparatus according to claim 16, wherein a front end portion of said image pick-up apparatus is bent sideways.

19. A magnifying observation apparatus according to claim 16, further comprising a viewing hole formed in the casing and wherein said optical system focuses the image of an object located proximate the viewing hole on the imaging device.

20. A magnifying observation apparatus according to claim 16, wherein an objective lens of said optical system and said imaging device slide in interlock with each other to adjust magnification.

21. A magnifying observation apparatus according to claim 16, wherein an objective lens of said optical system is movable to adjust magnification.

22. A magnifying observation apparatus according to claim 16, wherein the image pick-up apparatus is connected to the monitor by a wire that transmits a video signal from the imaging device to the monitor.

23. A magnifying observation apparatus that includes an image pick-up apparatus for reproducing an image of an object located proximate the image pick-up apparatus onto a monitor display, said image pick-up apparatus comprising a casing having a viewing hole, the casing enclosing at least an imaging device, a control circuit unit for the imaging device, an optical system for focusing the image of an object located proximate the viewing hole on the imaging device, the optical system comprising an objective lens that is movable to adjust magnification.

24. A magnifying observation apparatus according to claim 23, further comprising a light-source lamp unit that includes at least one lamp arranged on a board such that the lamp unit can be mounted to and removed from said image pick-up apparatus.

25. A magnifying observation apparatus according to claim 23, wherein a front end portion of said image pick-up apparatus is bent sideways.

26. A magnifying observation apparatus according to claim 23, wherein an objective lens of said optical system and said imaging device slide in interlock with each other to adjust magnification.

27. A magnifying observation apparatus according to claim 23, wherein the image pick-up apparatus is connected to the monitor by a wire that transmits information from the imaging device to the monitor.

28. A magnifying observation apparatus that includes an image pick-up apparatus for reproducing an image of an object located proximate the image pick-up apparatus onto a monitor display, said image pick-up apparatus comprising a casing having a viewing hole, an imaging device that is movable in relation to the viewing hole, the observation apparatus further comprising a control circuit unit for the imaging device, an optical system located in the image pick-up apparatus for focusing the image of an object located proximate the viewing hole, the optical system comprising an objective lens that is movable to adjust magnification.

29. A magnifying observation apparatus according to claim 28, further comprising a light-source lamp unit that includes at least one lamp arranged in the image pick-up apparatus casing on a board such that the lamp unit can be mounted to and removed from said image pick-up apparatus.

30. A magnifying observation apparatus according to claim 28, wherein a front end portion of said image pick-up apparatus is bent sideways.

31. A magnifying observation apparatus according to claim 28, wherein an objective lens of said optical system and said imaging device slide in interlock with each other to adjust magnification.

32. A magnifying observation apparatus according to claim 28, wherein the image pick-up apparatus is connected to the monitor by a wire that transmits information from the imaging device to the monitor.

* * * * *

UNITED STATES PATENT AND TRADEMARK OFFICE
CERTIFICATE OF CORRECTION

PATENT NO. : 5,442,489

DATED : August 15, 1995

INVENTOR(S) : Kiyokazu Yamamoto and Masao Yamamoto

It is certified that error appears in the above-identified patent and that said Letters Patent is hereby corrected as shown below:

Column 11, line 46, change "and" into --an--.

Signed and Sealed this

Thirtieth Day of July, 1996

Attest:

BRUCE LEHMAN

*Attesting Officer*         *Commissioner of Patents and Trademarks*

(12) EX PARTE REEXAMINATION CERTIFICATE (7427th)
United States Patent
Yamamoto et al.

(10) Number: US 5,442,489 C1
(45) Certificate Issued: Mar. 30, 2010

(54) MAGNIFYING OBSERVATION APPARATUS

(75) Inventors: Kiyokazu Yamamoto, Tokyo (JP); Masao Yamamoto, Tokyo (JP)

(73) Assignee: Scalar Corporation, Shibuya-Ku, Tokyo (JP)

Reexamination Request:
No. 90/010,006, Aug. 6, 2007

Reexamination Certificate for:
Patent No.: 5,442,489
Issued: Aug. 15, 1995
Appl. No.: 08/311,724
Filed: Sep. 23, 1994

Certificate of Correction issued Jul. 30, 1996.

Related U.S. Application Data

(63) Continuation-in-part of application No. 07/983,848, filed as application No. PCT/JP92/00836 on Jul. 2, 1992, now abandoned.

(30) Foreign Application Priority Data

| Jul. 4, 1991 | (JP) | 3-059676 |
| Jul. 4, 1991 | (JP) | 3-059677 |
| Jul. 4, 1991 | (JP) | 3-189569 |

(51) Int. Cl.
*G02B 27/00* (2006.01)

(52) U.S. Cl. .......... 359/810; 348/E7.087; 359/385; 359/798; 359/800; 359/802

(58) Field of Classification Search .......... None
See application file for complete search history.

(56) References Cited

U.S. PATENT DOCUMENTS

| 2,258,304 A | 10/1941 | Stanton |
| 2,280,561 A | 4/1942 | Wappler |
| 3,279,460 A | 10/1966 | Sheldon |
| 3,561,432 A | * 2/1971 | Yamaki et al. .......... 600/167 |
| 3,582,181 A | 6/1971 | Dolores et al. |
| 3,638,643 A | 2/1972 | Hotchkiss |
| 3,884,222 A | 5/1975 | Moore |
| 4,157,216 A | 6/1979 | Plummer |
| 4,236,781 A | 12/1980 | Arimura |
| 4,288,690 A | 9/1981 | Sanner |

(Continued)

FOREIGN PATENT DOCUMENTS

| JP | 56-68870 | 6/1981 |
| JP | 59-088135 | 5/1984 |
| JP | 60-81645 | 5/1985 |
| JP | 61-296869 | 12/1986 |
| JP | 62-073877 | 4/1987 |

(Continued)

OTHER PUBLICATIONS

Article entitled "Analysis, Test And Measurement Issue" published in Photonics, International Journal of Optics, Lasers, Fiber Optics, Electro–Optics, Imaging and Optical Computing, Oct. 1990, pp. 4, 5, 76.
Color Video Camera article published in The Dempa Shimbun, Jun. 25, 1991 and English translation.

(Continued)

*Primary Examiner*—Minh T Nguyen

(57) ABSTRACT

The present invention relates to a magnifying observation apparatus of a video type in which an image of an object to be observed which has been picked up by an image pick-up apparatus incorporating an imaging device therein is reproduced on a monitor display and observed. It is an object of the invention to attain a compact structure of the entire system so as to permit easy observation in a simple manner. According to the present invention, in order to achieve such object, not only the imaging device but also a control circuit unit for the imaging device, an optical system for focusing the image of the object to be observed on the imaging device, and a light-source lamp for lighting the object to be observed, are incorporated in the image pick-up apparatus.

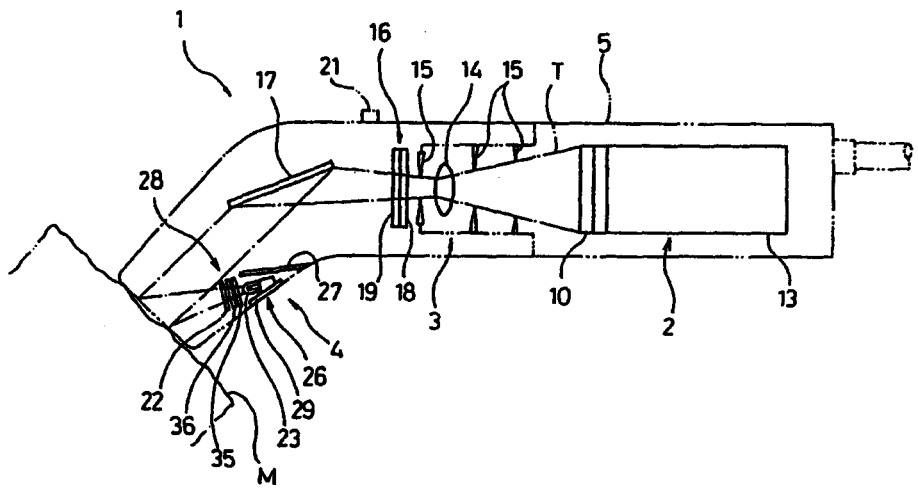

U.S. PATENT DOCUMENTS

| | | | |
|---|---|---|---|
| 4,310,228 A | 1/1982 | Terada |
| 4,324,466 A | 4/1982 | Takayama |
| 4,343,300 A | 8/1982 | Hattori |
| 4,413,278 A | 11/1983 | Feinbloom |
| 4,414,608 A | 11/1983 | Furihata |
| 4,461,558 A | 7/1984 | Tanikawa et al. |
| 4,475,540 A | 10/1984 | Takamatsu et al. |
| 4,561,429 A | 12/1985 | Sato et al. |
| 4,577,927 A | 3/1986 | Raney |
| 4,590,923 A | 5/1986 | Watanabe |
| 4,641,635 A | 2/1987 | Yabe |
| 4,682,586 A | 7/1987 | Matsuo |
| 4,727,416 A | 2/1988 | Cooper et al. |
| 4,832,003 A | 5/1989 | Yabe |
| 4,846,155 A | 7/1989 | Kimura |
| 4,854,302 A | 8/1989 | Allred, III |
| 4,858,001 A | 8/1989 | Milbank et al. |
| 4,870,950 A | 10/1989 | Kanbara et al. |
| 4,915,626 A | 4/1990 | Lemmey |
| 4,947,245 A | 8/1990 | Ogawa et al. |
| 4,989,083 A | 1/1991 | Eino |
| 4,989,582 A | 2/1991 | Sakiyama et al. |
| 4,993,405 A | 2/1991 | Takamura et al. |
| 5,016,098 A | 5/1991 | Cooper et al. |
| 5,027,138 A | 6/1991 | Gandrud |
| 5,049,070 A | 9/1991 | Ademovic |
| 5,115,261 A | 5/1992 | Noda et al. |
| 5,115,307 A | 5/1992 | Cooper et al. |
| 5,159,380 A | 10/1992 | Furuya et al. |
| 5,191,369 A | 3/1993 | Furuya et al. |
| 5,251,025 A | 10/1993 | Cooper et al. |
| 5,267,087 A | 11/1993 | Weidemann |
| 5,290,168 A | 3/1994 | Cooper et al. |
| 5,429,502 A | 7/1995 | Cooper et al. |

FOREIGN PATENT DOCUMENTS

| | | |
|---|---|---|
| JP | 62-086322 | 4/1987 |
| JP | 63-068807 | 3/1988 |
| JP | 63-142239 | 6/1988 |
| JP | 63-246731 | 10/1988 |
| JP | 2-36266 | 3/1990 |
| JP | 2-207401 | 8/1990 |
| JP | 2-282202 | 11/1990 |
| JP | 02-282202 | 11/1990 |
| JP | 3-135276 | 6/1991 |
| JP | 5-006983 | 1/1993 |

OTHER PUBLICATIONS

Article entitled "CCD—The Solid State Imaging Technology" published in Fairchild Catalog 1982–1983, by Frank H. Bower—3 pages.

Hayashi, Toshihiko, et al. Article entitled "Industrial CCD Camera" Electronics, 1989–7, pp. 62–69 and English translation.

English translations of JP 61–296869, JP 63–246731, JP 2–36266, 2–282202, 05–6983,59–88135, 60–81645, 62–86322, 63–68807, 63–142239.

English language Abstracts of JP 2–207401 and JP 3–135276.

Article In The Dempa Shimbun, Sony To Release Micromini Camera For Industrial Use (1/6 As Large As Before), Jun. 25, 1991 ("Sony") (Exhibit 6).

Catalog For Fairchild Charge Coupled Device ("Fairchild") (Exhibit 7).

Article In Electronics, Industrial CCD Camera, Hayashi, Toshihiko, et al., 1989–7 ("Hayashi") (Exhibit 8).

Advertisement in Photonics, Philips CCD Imaging Modules, Oct. 1990, p. 77 ("Philips") (Exhibit 9).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 6 is confirmed.

Claims 1, 7, 11, 16, 19, 23 and 28 are determined to be patentable as amended.

New claims 33–50 are added and determined to be patentable.

Claims 2–5, 8–10, 12–15, 17–18, 20–22, 24–27 and 29–32 were not reexamined.

1. A magnifying observation apparatus for reproducing an image of an object to be observed which has been picked up by an image pick-up apparatus onto a monitor display and observing it, said image pick-up apparatus having a structure with a case of an essentially one-handed [grapsable] *graspable* size, said case having [a] *an uncovered* viewing hole formed therein and encasing therein at least an imaging device, a control circuit unit for the imaging device, an optical system for focusing the image of the object to be observed on the imaging device, and a light-source lamp [encases] *encased* by the casing for lighting the object to be observed through the viewing hole.

7. A magnifying observation apparatus that includes an image pick-up apparatus for reproducing, onto a monitor display, an image of an object located proximate the image pick-up apparatus which has been picked up by an image pick-up apparatus the image pick-up apparatus including a casing having [a] *an uncovered* viewing hole formed therein and further including at least an imaging device, a control circuit unit for the imaging device, an optical system for focusing the image of [an] *the* object [to] located proximate the viewing hole on the imaging device, and a light-source lamp for lighting the object to be observed, wherein said light-source lamp is formed as a lamp unit comprising a plurality of lamps arranged in a predetermined state on a board in such a manner that the entire lamp unit can be mounted to and removed from said image pick-up apparatus.

11. A magnifying observation apparatus that includes an image pick-up apparatus for reproducing an image of an object located proximate the image pick-up apparatus onto a monitor display, said image pick-up apparatus comprising a casing having [a] *an uncovered* viewing hole, the casing enclosing at least an imaging device, a control circuit unit for processing a signal received from the imaging device and emitting a video signal, an optical system for focusing the image of [an] *the* object located proximate the viewing hole on the imaging device, and a light-source for lighting the object to be observed.

16. A magnifying observation apparatus that includes an image pick-up apparatus for reproducing an image of an object located proximate to *the* image pick-up apparatus onto a monitor display, said image pick-up apparatus comprising a casing *having an uncovered viewing hole*, the casing enclosing at least an imaging device, a control circuit unit for the imaging device, an optical system for focusing the image of [an] *the* object onto the imaging device, and a light-source lamp means for lighting the object to be observed.

19. A magnifying observation apparatus according to claim 16, [further comprising a viewing hole formed in the casing and] wherein said optical system focuses the image of an object located proximate the viewing hole on the imaging device.

23. A magnifying observation apparatus that includes an image pick-up apparatus for reproducing an image of an object located proximate the image pick-up apparatus onto a monitor display, said image pick-up apparatus comprising a casing having [a] *an uncovered* viewing hole, the casing enclosing at least an imaging device, a control circuit unit for the imaging device, an optical system for focusing the image of [an] *the* object located proximate the viewing hole on the imaging device, the optical system comprising an objective lens that is movable to adjust magnification.

28. A magnifying observation apparatus that includes an image pick-up apparatus for reproducting an image of an object located proximate the image pick-up apparatus onto a monitor display, said image pick-up apparatus comprising a casing having [a] *an uncovered* viewing hole, an imaging device that is movable in relation to the viewing hole, the observation apparatus further comprising a control circuit unit for the imaging device, an optical system located in the image pick-up apparatus for focusing the image of [an] *the* object located proximate the viewing hole, the optical system comprising an objective lens that is movable to adjust magnification.

*33. A magnifying observation apparatus according to claim 1, wherein the control circuit unit controls the imaging device, and*
 *wherein the optical system focuses the image of the object to be observed on the imaging device and magnifies the image, while the image pick-up apparatus is maintained at a predetermined fixed distance from the object to be observed.*

*34. A magnifying observation apparatus according to claim 1, wherein the light-source lamp is formed as a lamp unit comprising a plurality of lamps arranged in a predetermined state on a board in such a manner that the whole of the lamp unit can be mounted to said image pick-up apparatus.*

*35. A magnifying observation apparatus according to claim 1, wherein the viewing hole defines a geometric center, wherein the optical system defines an optical axis, and wherein the geometric center of the viewing hole and the optical axis of the optical system are collinear.*

*36. A magnifying observation apparatus according to claim 1, wherein the imaging device captures color images and sends the color images to the monitor display.*

*37. A magnifying observation apparatus according to claim 1, wherein the light-source lamp is formed as a lamp unit comprising a plurality of lamps mounted on a common board, wherein the common board is formed with a power supply circuit for supplying power to the plurality of lamps, and wherein each one of the plurality of lamps illuminates in response to electrical current.*

38. A magnifying observation apparatus according to claim 1, wherein the optical system includes a lens having a diameter and wherein the lens is spaced apart from the viewing hole by a distance greater than the diameter of the lens.

39. A magnifying observation apparatus according to claim 1, wherein the optical system defines an optical axis and wherein the light-source lamp comprises lamps mounted at an angle to the optical axis.

40. A magnifying observation apparatus according to claim 1, wherein the light-source lamp comprises a plurality of light elements mounted on a single circuit board.

41. A magnifying observation apparatus according to claim 1, wherein the optical system and the light-source lamp are exposed through the viewing hole to environmental conditions outside of the casing.

42. A magnifying observation apparatus according to claim 6, wherein the image pick-up apparatus has a case configured to be held and used by one hand and defines a viewing hole, wherein the control circuit unit controls the imaging device, and wherein the optical system focuses the image of the object to be observed on the imaging device and magnifies the image, while the image pick-up apparatus is maintained at a predetermined fixed distance from the object to be observed.

43. A magnifying observation apparatus according to claim 7, wherein the casing is configured to be held and used by one hand, wherein the control circuit unit controls the imaging device, and wherein the optical system is configured to focus the image of the object on the imaging device and magnify the image, while the image pick-up apparatus is maintained at a predetemined fixed distance from the object.

44. A magnifying observation apparatus according to claim 11, wherein the casing is configured to be held and used by one hand, wherein the control circuit unit controls the imaging device, and wherein the optical system focuses the image of the object on the imaging device and magnifies the image, while the image pick-up apparatus is maintained at a predetermined fixed distance from the object.

45. A magnifying observation apparatus according to claim 16, wherein the casing is configured to be held and used by one hand, wherein the control circuit unit contols the imaging device, and wherein the optical system focuses the image of the object onto the imaging device and magnifies the image, while the image pick-up apparatus is maintained at a predetermined fixed distance from the object.

46. A magnifying observation apparatus according to claim 23, wherein the casing is configured to be held and used by one hand, wherein the control circuit unit controls the imaging device, and wherein the optical system focuses the image of the object on the imaging device and magnifies the image, while the image pick-up apparatus is maintained at a predetermined fixed distance from the object.

47. A magnifying observation apparatus according to claim 28, wherein the casing is configured to be held and used by one hand, wherein the control circuit unit controls the imaging device, and wherein the optical system focuses the image of the object on the imaging device and magnifies the image, while the image pick-up apparatus is maintained at a predetermined fixed distance from the object.

48. A magnifying observation apparatus according to claim 33, wherein the predetermined fixed distance is the distance between an outer edge of the viewing hole and the object to be observed.

49. A magnifying observation apparatus according to claim 1, wherein the viewing hole defines a plane and wherein the optical system is configured to focus on the plane so as to focus on the object when the object is abutted against the viewing hole.

50. A magnifying observation apparatus according to claim 1, wherein the control circuit unit controls the imaging device, and wherein the optical system focuses the image of the object to be observed on the imaging device and magnifies the image, while the imaging device is maintained at a predetermined fixed distance from the object to be observed.

\* \* \* \* \*